(No Model.)

J. SILBERMAN.
PLOW.

No. 443,229. Patented Dec. 23, 1890.

Witnesses:

Inventor:
Joseph Silberman

UNITED STATES PATENT OFFICE.

JOSEPH SILBERMAN, OF NASHVILLE, TENNESSEE, ASSIGNOR OF ONE-HALF TO SOLOMON KLEINMAN, OF SAME PLACE.

PLOW.

SPECIFICATION forming part of Letters Patent No. 443,229, dated December 23, 1890.

Application filed February 25, 1890. Serial No. 341,778. (No model.)

*To all whom it may concern:*

Be it known that I, JOSEPH SILBERMAN, a citizen of the United States, residing at Nashville, in the county of Davidson and State of Tennessee, have invented a new and useful Improvement on a Plow for Hillside Plowing; and I do hereby declare that the following is a full, clear, and exact description of the invention, which will enable others skilled in the science to which it appertains to make and use the same.

My invention relates to an improvement on a plow for hillside plowing; and the object of my invention is to plow from one side of a field to the other along the side of the hill, and then by reversing the plow at each end of the field go back across the field along the same furrow just made, thus avoiding uphill and downhill plowing. I attain this object by the mechanism illustrated in the accompanying drawings, in which—

Figure 1:
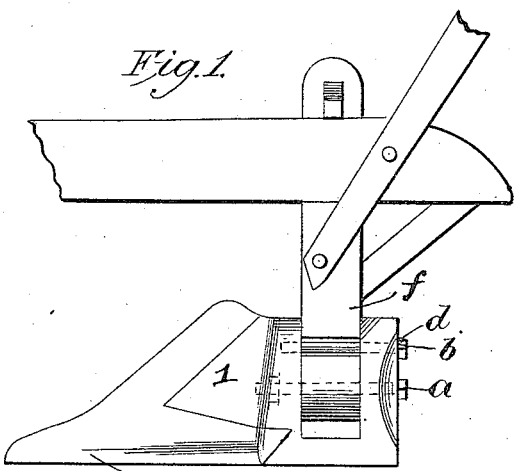
Figure 2:
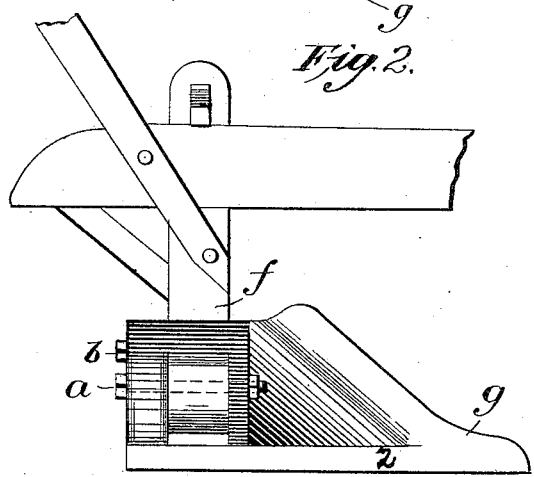
Figure 3:
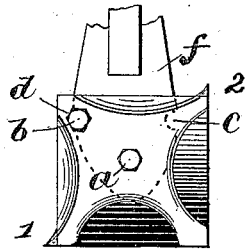
Figure 4:
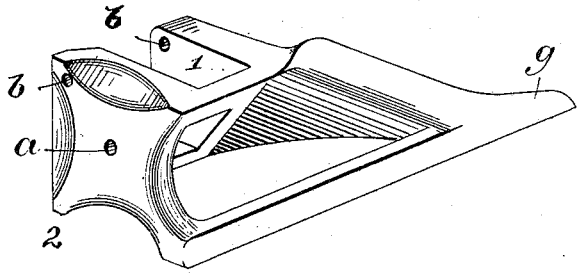

Figure 1 is a view of the left side of the whole plow when said plow is a right-hand plow. Fig. 2 is a view of the right side of the right-hand plow. Fig. 3 is a rear elevation of the whole plow with the beams and handles of the plow removed, and Fig. 4 is a view of the plow with handles and beam removed when the plow has been turned to the left from the position in Fig. 2 forty-five degrees.

Similar letters and figures refer to similar parts throughout the several views.

$a$ is the pivot or bolt around which the adjustable part of the plow is turned.

$b$ is the stay pin or key.

$c$ and $d$ are the holes for the pin $b$ when the plow is in its different positions—viz., as a right-hand or left-hand plow.

$f$ is the helve or the part upon which the handles and beam of the plow are supported and into which the pivot or bolt $a$ extends.

$g$ is the point of the plow.

1 is the view of the mold-board as seen from the left side of the right-hand plow.

2 is the view of the mold-board, showing landside as seen from the right side of the right-hand plow.

My plow is described as follows: It consists of a mold-board, as shown in drawings and designated by 1 and 2, through which the two holes $c$ and $d$ are made, and there is also a hole in said mold-board, in which the pivot or bolt $a$ is inserted, and around which the adjustable part of the plow is turned. The plow also consists of a helve $f$, which is the part of the plow upon which the handles and beam of the plow are supported, and into which the pivot or bolt $a$ is inserted in such a manner as to allow the mold-board to be turned from one side to the other around it. There is also a stay pin or key $b$, the purpose of which is to insert it into the holes $c$ and $d$, respectively, depending upon whether the plow is a left or right handed plow, and when inserted in one of these holes it holds the mold-board steady, thus rendering the plow ready for plowing. Of course the plow has also the parts common to all plows—viz., beam, handles, point, &c.; but as there is no patent asked for on these it will be unnecessary to describe them more particularly than to say they are of the kind and nature used on ordinary plows.

My plow is made in the following manner: The mold-board and landside and nose of the plow are cast in one piece, and are made as follows: The nose or the part to which the point of the plow is fastened is in the shape of the letter V, and is made in this way: Take a solid piece of iron or other material about the length and breadth of an ordinary plow and of rectangular shape. Place this piece of material on its longer base with a long side toward you. Then from the upper right-hand far corner draw a line at an angle of about forty-five degrees, extending to the top side nearest to you. Along this line cut directly through the piece perpendicularly to the lower side. Then from the point on the nearest upper line or edge, obtained as above stated, draw a line at right angles to the upper far edge, and from this point draw a line to the lower far right-hand corner. Then by cutting the material inclosed by these two lines we will get the part of the plow to which the point is fastened, or the nose, and which is in the shape of the letter V, as stated above. I next carve out the place in which the helve is inserted in the following manner: Leaving the piece of material in the same position as above, commence at a point about two or three inches from the upper left-hand corner on a line drawn at an angle of about forty-five degrees to said corner and across the top of the material. Measure then from said point on a line parallel to the upper far edge a distance a little greater than the thickness of the helve. Then the line drawn between these two points obtained represents the width of the space to be carved out for the helve. From these two points draw parallel lines at right angles to the upper edge nearest you. Then from the two points thus obtained on the upper nearest edge draw parallel lines perpendicular to the lower nearest edge, but the two last-mentioned lines to be extended only to within two or three inches of the lower nearest edge. Now cut out the material inclosed within these five last-obtained lines and I have the space made for the insertion of the helve. This latter process of making the space for the helve forms the two lugs, (exterior and interior lugs,) the interior lug being very much in the shape of a right-angle triangle, and the exterior lug, being in the shape of a square with two of its sides slightly convex, curves, as shown. The landside is next made thus: By commencing at the lower inside far corner of the exterior lug and cutting out all the material between that point and the far right-hand lower corner, or point of nose of plow, as made above, with the exception of a piece of the width and depth of about two or three inches each on the lower far edge, and extending along the lower far edge to the right-hand lower corner or point of the nose, thus making the landside, as shown. I now slightly convex the lower and far edges of the exterior lug and make the holes in the exterior and interior lugs for the pins or bolts $a$ and $b$, as shown by the drawings filed herewith. All of the said parts of the plow and the making thereof will be easily understood by reference to the model filed heretofore.

I am aware that plows for hillside plowing have been made prior to my invention. I am also aware that such plows have been made in which the plow turned over the landside. I therefore do not claim such combination broadly; but What I do claim as my invention, and desire to secure by Letters Patent, is—

In a reversible plow, the combination, with the beam and standard, of a mold board and landside having two like faces and provided with interior and exterior lugs or ears pivoted to the standard or helve, said plow adapted to rotate above its base or landside, and said lugs having a central pivot-bolt hole and stay-bolt holes at their upper corners, and the pivot-bolt and the bolt to secure the plow in a right-hand or left-hand position, substantially as shown and described.

JOSEPH SILBERMAN.

Witnesses:
GEO. B. GUILD,
HUGH GRIGG.